United States Patent [19]
Miller et al.

[11] Patent Number: 5,887,929
[45] Date of Patent: Mar. 30, 1999

[54] GARAGE DOOR OPENER BIN

[75] Inventors: Bradley D. Miller, Jenison; John Rickfelder, Grand Haven; Douglas A. Fischer, Grand Rapids, all of Mich.

[73] Assignee: Lear Donnelly Overhead Systems, L.L.C., Novi, Mich.

[21] Appl. No.: 896,043

[22] Filed: Jul. 17, 1997

Related U.S. Application Data

[60] Provisional application No. 60/022,238, Jul. 18, 1996.
[51] Int. Cl.⁶ .................................................. B60R 11/00
[52] U.S. Cl. ........................................ 296/37.8; 296/37.7
[58] Field of Search ................................ 296/37.8, 37.7; 224/282, 311, 312; 200/61.62; 340/825.69; 455/99

[56] References Cited

U.S. PATENT DOCUMENTS

| | | |
|---|---|---|
| 3,936,833 | 2/1976 | Bush . |
| 4,595,228 | 6/1986 | Chu . |
| 4,867,498 | 9/1989 | Delphia et al. . |
| 5,020,845 | 6/1991 | Falcoff et al. . |
| 5,064,974 | 11/1991 | Vigneau et al. ........................ 296/37.7 |
| 5,388,880 | 2/1995 | Kinane . |
| 5,522,638 | 6/1996 | Falcoff et al. . |
| 5,713,623 | 2/1998 | Mattingly ................................ 296/37.7 |

*Primary Examiner*—D. Glenn Dayoan
*Assistant Examiner*—Jason Morrow
*Attorney, Agent, or Firm*—Rader, Fishman, Grauer & Mc Garry

[57] ABSTRACT

An overhead console for a vehicle has a support structure (14) with walls (30, 80, 82, 84) and an access door (10) defining a compartment (78) for storing a remote transmitter (86). The transmitter (86) includes an actuator switch (92) that is normally manipulated by a user for operating the transmitter (86) to open a garage door, turn on lights, etc., from inside the vehicle. The console access door (10) is attached to the support structure (14) for movement between closed and open positions. A manually operable actuator (12) is engageable with the transmitter switch (92) for operating the transmitter (86) upon depression of the actuator (12). The actuator (12) is attached to the support structure (14) independent of the door (10) such that movement of the actuator (12) is at least substantially unaffected by movement of the door (10) between the closed and open positions. With this arrangement, the transmitter switch (92) and actuator (12) can be mutually aligned with the door (10) in the open position by positioning the transmitter (86) in the compartment (78) and adjusting the transmitter (86) with respect to the actuator (12).

23 Claims, 11 Drawing Sheets

GARAGE DOOR OPENER BIN

CROSS-REFERENCE TO RELATED APPLICATION

This application claims the benefit of U.S. Provisional Application No. 60/022,238 filed on Jul. 18, 1996.

BACKGROUND OF THE INVENTION

1. Field of the Invention

This invention generally relates to vehicles having an auxiliary storage compartment associated with the roof of the vehicle. More particularly, the invention relates to an overhead console including a bin for storing a portable transmitter which operates a garage door opener.

2. Description of the Related Art

Electrically operated garage door openers have become quite popular with automobile owners. Typically, a portable battery-powered transmitter is carried in the vehicle for selectively transmitting a radio signal for activating a garage door opening mechanism and/or other actuators. These portable transmitting units are often clipped to the visor, stored in the glove compartment or simply left lying on the seat or dashboard of the vehicle. Since such storage arrangements can be quite inconvenient for the driver, various transmitter storage compartments have been proposed where the transmitter can be activated inside the compartment. For example, U.S. Pat. No. 4,595,228 to Chu discloses a compartment having a removable X-shaped cone arranged on the inside of the compartment door for engaging the actuator button of the transmitter. U.S. Pat. No. 5,064,974 to Vigneau et al., discloses a compartment door which supports a hinged lever having a pin that engages the transmitter actuator button.

SUMMARY OF THE INVENTION

According to the invention, an automobile console includes a support structure having a compartment for accommodating a portable transmitter, a door which is pivotally secured to the support structure for accessing the compartment, and a manually operably actuator such as a button which is cantilevered from the support structure into the compartment and protrudes through the door. The door can include hinge pins which are pivotally secured to hinge arms on the support structure. The door can also include a cam-operated damping system.

The overhead console support structure has walls and an access door defining a compartment for storing a remote transmitter. The transmitter includes an actuator switch that is normally manipulated by a user for operating the transmitter to open a garage door, turn on lights, etc., from inside the vehicle. The portable transmitter can be secured to an inside wall of the compartment using a suitable fastener, such as Velcro, to arrange the transmitter in alignment with the button. The console access door is attached to the support structure for movement between closed and open positions.

A manually operable actuator is engageable with the transmitter switch for operating the transmitter upon depression of the actuator. Preferably, the actuator is attached to the support structure of the door such that movement of the actuator is at least substantially unaffected by movement of the door between the closed and open positions. With this arrangement, the transmitter switch and actuator can be mutually aligned with the door in the open position by positioning the transmitter in the compartment and adjusting the transmitter with respect to the actuator in at least one direction.

In one embodiment, the actuator comprises a push button and at least one cantilevered arm having a first end extending from the button and a second end attached to the support structure. The door has an aperture for receiving at least a portion of the button for accessing the button outside of the compartment. The cantilevered arm biases the push button toward the aperture. Preferably, the support structure comprises a slot and the second end of the cantilevered arm has a first tab that fits within the slot for attaching the actuator to the support structure. A locking tab is connected to the cantilevered arm and extends into the slot for locking the actuator to the support structure. A second cantilevered arm can be provided, with a first end of the second arm extending from the button and a second end having a second tab that fits within the slot. With this arrangement, the locking tab is positioned between the cantilevered arms and extends in the same general direction as the first and second tabs.

In a further embodiment, the actuator is removably secured to the overhead console.

The push button has an outer surface for contact by a user and an inner surface with one or more receptacles facing the interior of the compartment. An intermediate member is insertable into the receptacle(s) and is positioned for contacting the transmitter switch. Depression of the button causes corresponding movement of the actuator switch and operation of the transmitter. Preferably, a plurality of intermediate members are provided for insertion into the one or more receptacles.

In one embodiment, the intermediate members are of different heights for accommodating various distances between the button inner surface and remote actuators of different thickness.

In another embodiment, each intermediate member includes an upper surface with a receptacle and a lower surface that is engageable with a receptacle on an adjacent intermediate member. In this manner, the intermediate members are stackable on each other to accommodate various distances between the button inner surface and remote actuators of different heights. The invention is advantageous over conventional automobile consoles for at least the reason that the button and the door are independently secured to the support structure so that the door and button may be operated independently of each other in order to facilitate accurate alignment of the transmitter actuator switch with the pegs and striker blocks upon installation of the transmitter into the compartment.

BRIEF DESCRIPTION OF THE DRAWINGS

The invention will now be described with reference to the following drawings wherein similar features have been consistently identified with the same reference numerals in the various figures and wherein:

FIG. 5 is an exploded top perspective view of the partial console assembly in FIG. 4 absent the console door;

DETAILED DESCRIPTION OF THE PREFERRED EMBODIMENTS

Figure 1:
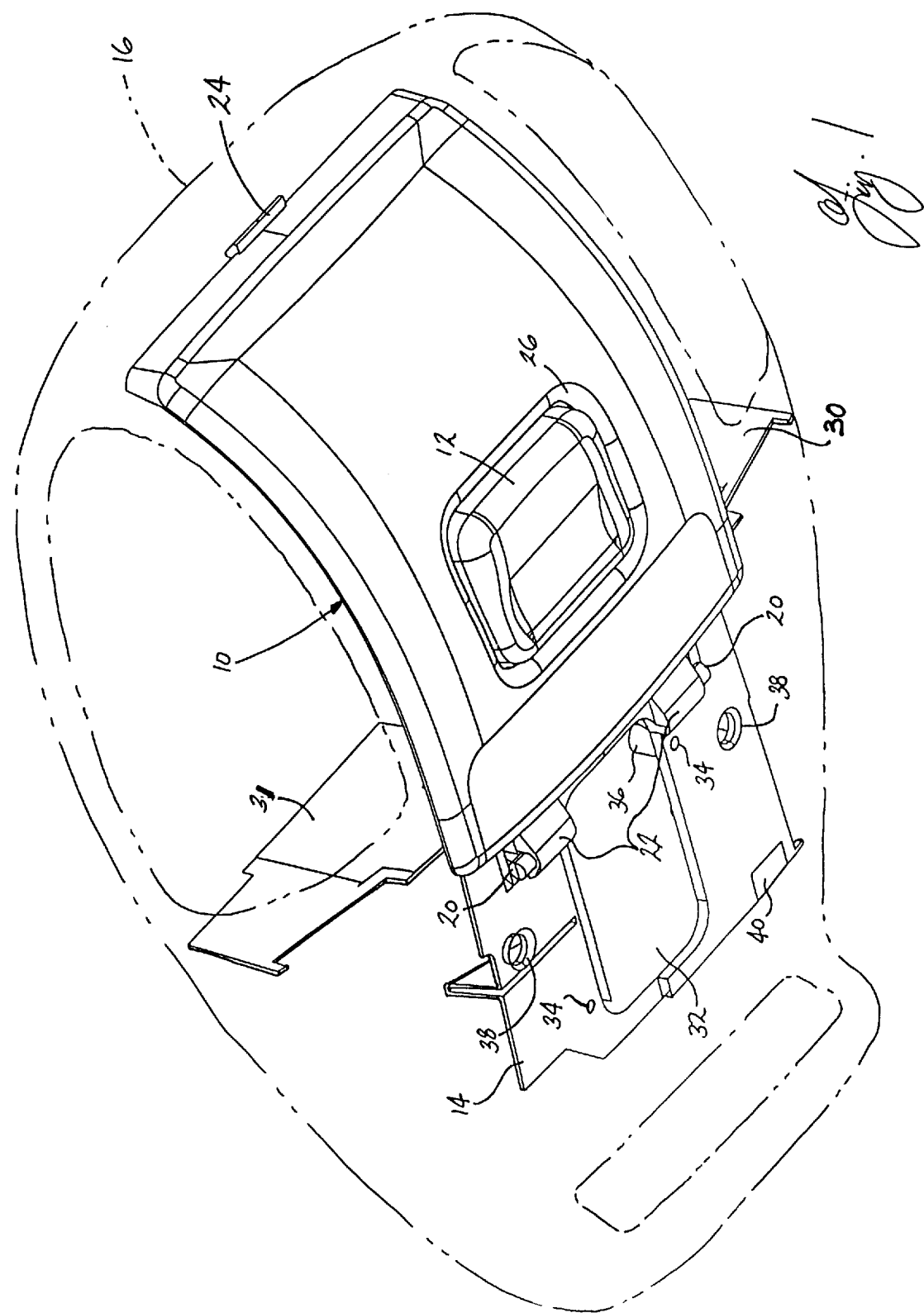
FIG. 1 is a top perspective view of a portion of a ceiling console assembly for an automobile with a housing portion shown in phantom line.

FIG. 1 shows a top perspective view of a portion of a ceiling console assembly 16, portions of which are shown in phantom lines, for use in an automobile passenger compartment. The console assembly 16 is preferably arranged on the passenger compartment roof between the front sun visors in the automobile's headliner (not shown). When viewed from the driver's perspective, the top surface shown in FIG. 1 will face the driver and interior of the vehicle. However, a variety of other arrangements can also be used. The illustrated console assembly 16 includes, for example, driver and passenger reading lights and various digital displays. The console assembly 16 can be formed from molded plastic or other similar material and fixed to the ceiling in the passenger compartment by attachment to the rigid header in the vehicle roof. A variety of fasteners, such as snap-fit fasteners, self-tapping screws, adhesives, and/or welds can be used to secure the console to the vehicle.

As illustrated in FIG. 1, the console assembly 16 includes a door 10 and button 12 which are removably secured to a support structure 14, as described in more detail below. The door 10 includes two spaced hinge pins 20 for rotatably securing one end of the door to a pair of spaced hinge arms 22 that extend from the support structure 14. A latch pin 24 is arranged on the other end of the door 10, opposite from the hinge pins 20, for securing the door 10 in a closed position. The door 10 also includes a beveled aperture or hole 26 which exposes a contoured surface of button 12. The door 10 can also include various other holes, bevels, and contours, some of which are illustrated in FIG. 1. The support structure 14 includes a pair of spaced vertical walls 30, 31 interconnected through a horizontally extending bight portion 33. The vertical walls 30, 31 form one side of a compartment 78 (FIG. 8) for accommodating a portable transmitter 86 used with a garage door opener. Other items can also be stored in the compartment.

A hole 32 can be formed in the support structure 14 for providing access to, for example, a control actuator for a sun roof. Bosses 36 having a centrally disposed fastener hole 34 can be used to secure a switch or other control mechanism, not shown, in the access hole 32. The fastener holes 34 are sized for engaging the threads on a screw, or other fastener. Cover post receptacles 38 extend into the support structure 14 for aligning a hinge cover (not shown) over the support structure 14. The hinge cover preferably includes a hole which is aligned with access hole 32 and one or more latches for snapping into latch receptacles, such as latch receptacle 40.

Figure 2:
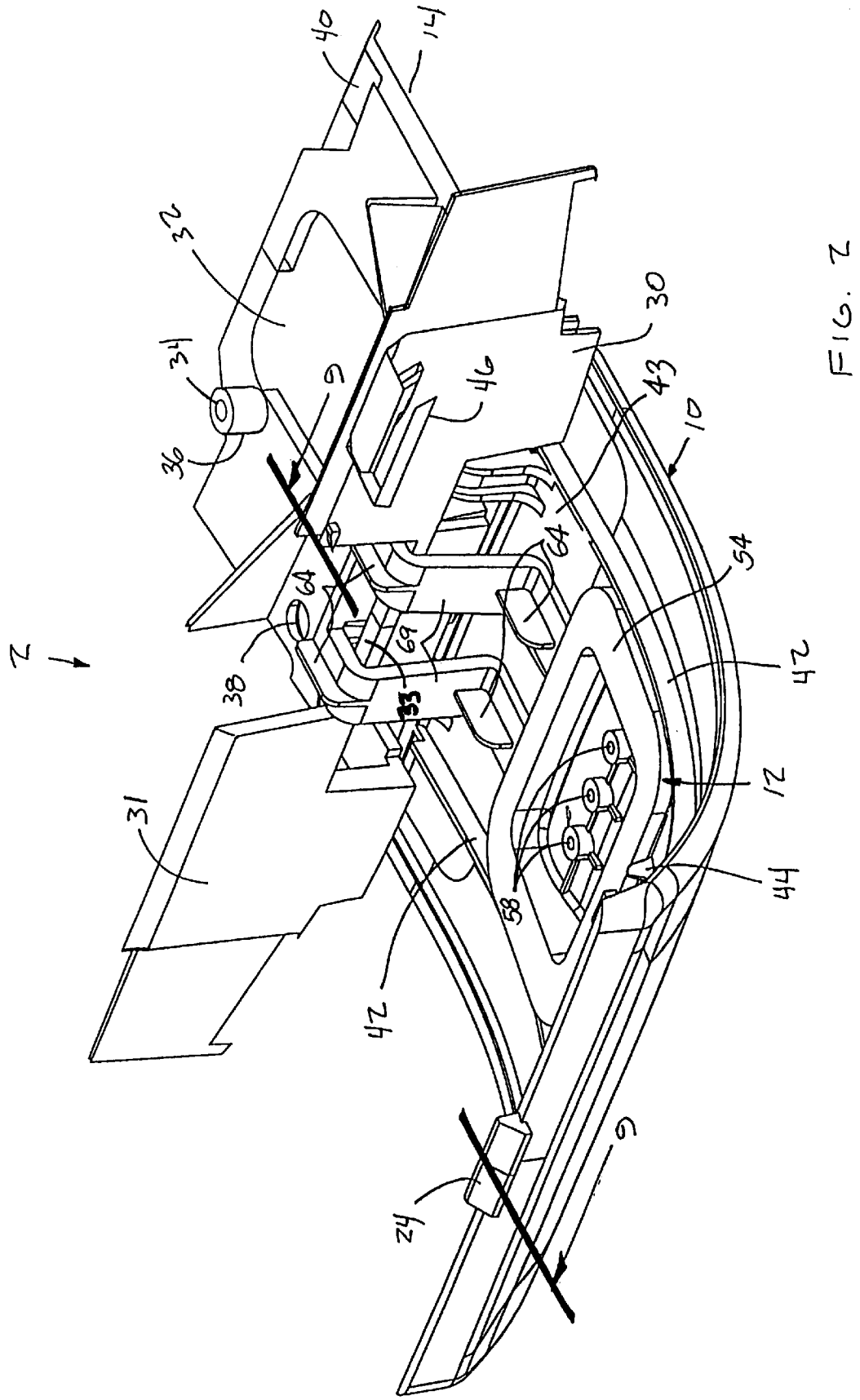
FIG. 2 is a bottom perspective view of a partial console assembly in FIG. 1 absent the housing portion.

As shown in FIG. 2, the door 10 can include one or more stiffening ribs 42 extending from an inner surface 43 of the door 10 and one or more detents 44 also extending from the inner surface 43 for aligning the button 12 with respect to the door 10. An electrical connector support arm 46, as well as various ears and lugs, can be arranged on the support structure 14.

Figure 3:
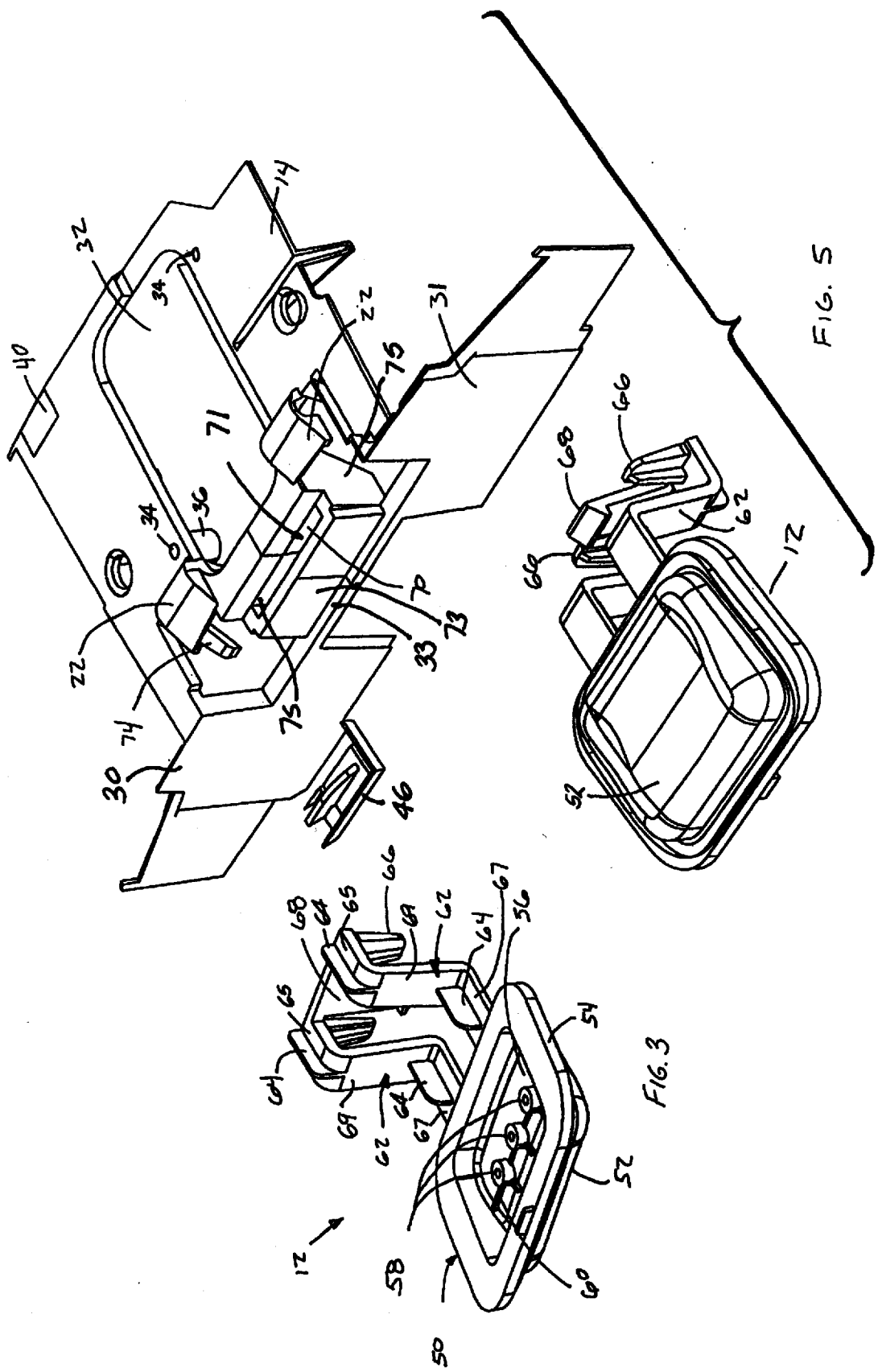
FIG. 3 is a bottom perspective view of a button for use with the console assembly in FIG. 1.

FIG. 3 is a bottom perspective view of the button 12 for use with the console assembly 16. As shown in FIG. 3, the button 12 includes a pad portion 50 having a contoured external surface 52, a flange 54, and an internal surface 56. The external surface 52 extends through the hole 26 in the door 10 as shown in FIG. 1. The flange 54 abuts the against the inside wall of the door 10 and helps prevent the button pad 50 from extending completely through the door 10. The internal surface 56 of the button pad 50 includes at least one, but preferably at least three, locator receptacles 58 for receiving pegs 90 or stackable striker blocks 91 of an appropriate length to engage the actuator button on a transmitter 86 arranged in the compartment (see FIGS. 9 and 10).

The peg locator receptacles 58 are preferably connected by stiffening ribs 60 which provide structural support for the button pad portion 50. Alternatively, the peg locator receptacles 58 can be replaced with a continuous rib for receiving striker blocks which are removably attached to the rib. The continuous rib can be in a variety of shapes and locations on the button pad 50 to facilitate positioning the striker blocks near the actuator button. A crisscrossing pattern of multiple ribs can also be used.

At least one, but preferably two, S-shaped cantilever arms 62 extend from one side of the flange portion 54 of button pad 50. Each of the cantilever arms 62 includes two stiffening ribs 64 arranged on the horizontal portions 65, 67 and vertical portion 69 of the cantilever arms 62 to provide an appropriate level of structural rigidity for the cantilever arms. An alignment tab 66 is arranged on the end of each of the cantilever arms 62 and a slightly longer latch tab 68 connects the ends of the cantilever arms 62 between the alignment tabs 66.

Figure 4:
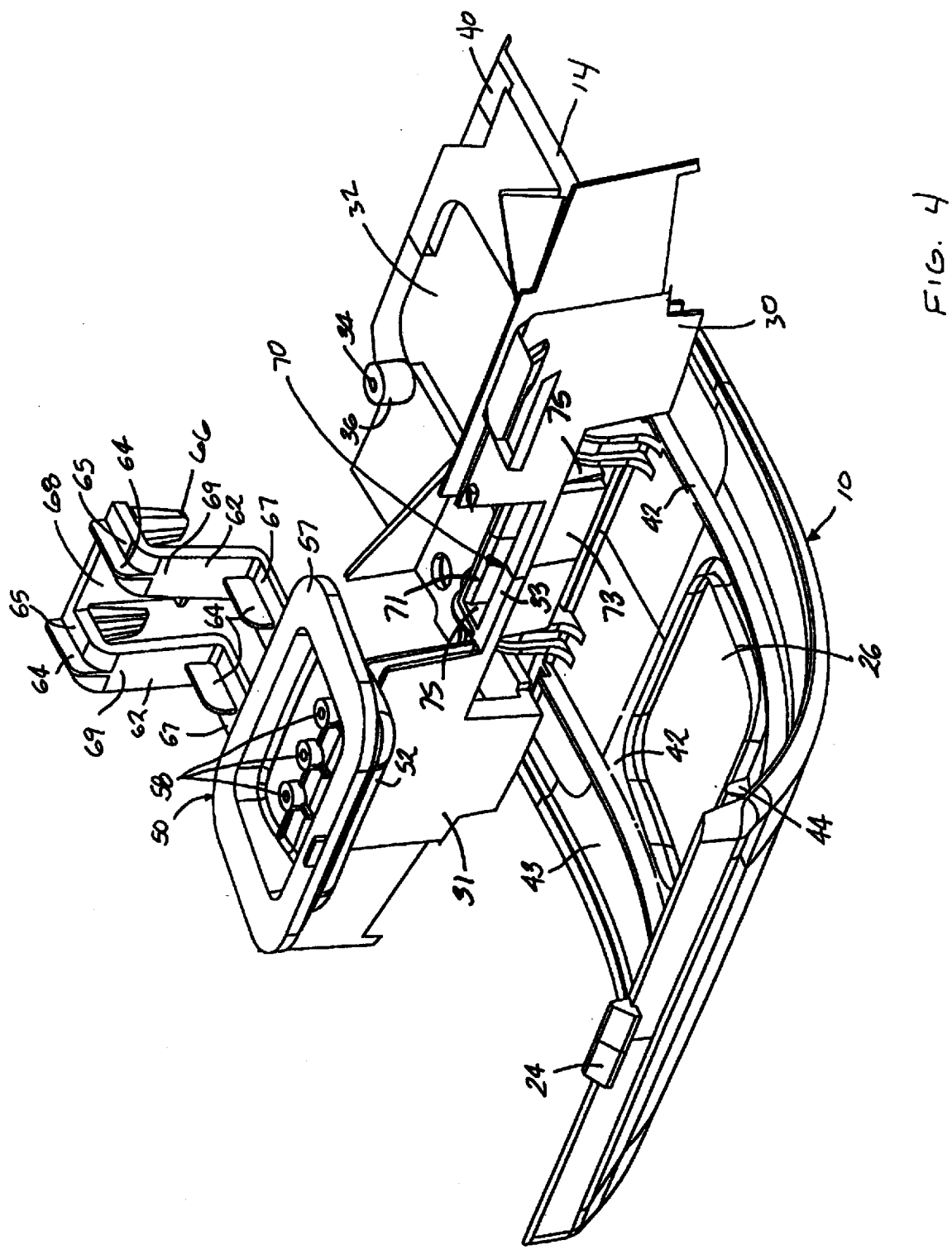
FIG. 4 is a exploded bottom perspective view of the partial console assembly in FIG. 2.
Figure 6:
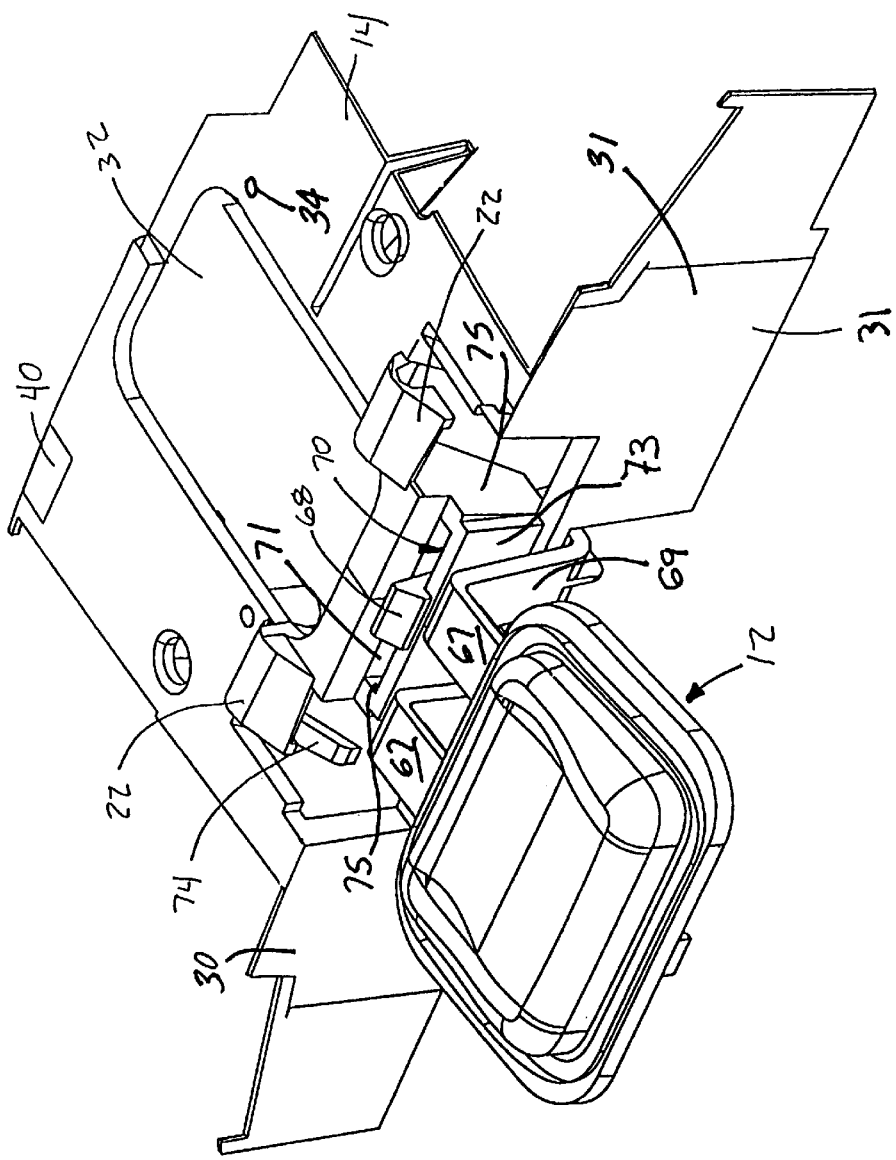
FIG. 6 is an assembled top perspective view of the partial console assembly in FIG. 5.

FIGS. 4 and 5 illustrate the alignment tabs 66 and latch tab 68 in alignment with an attachment slot 70 formed in the support structure 14. As shown in the assembled views of FIGS. 6 and 7, the attachment slot 70 is defined by a rear wall 71, a front wall 73 extending substantially parallel to the rear wall 71, and a pair of side walls 75 connected at the ends of the rear and front walls 71, 73. The rear wall 71 is integrally molded with the bight portion 33. In the installed position, the alignment tabs 66 extend into the attachment slot 70 between the front and rear walls 73, 71 while the latch tab 68 extends through the attachment slot 70 and then snaps into place over the bight portion 33. The hinge pins 20 on door 10 can similarly snap into the hinge arms 22. The support structure 14 can also include one or more guide arms 74 for guiding the hinge pins 20 into the proper position during assembly. The cantilever arms 62 are preferably constructed of a material that exhibits some resiliency in order to create a natural bias of the button 12 toward the hole 26 and inner surface 43 when installed on the overhead console without springs or other biasing mechanisms.

In an alternative embodiment, the button 12 can be pivotally secured to the support structure 14 rather than cantilevered as shown in FIGS. 2–4. If the button is pivotally mounted, a spring, such as a torsional spring or a leaf spring, can be secured between the button and the support structure 14 for normally urging the button to a position which does not activate the transmitter. However, the cantilevered arrangement shown in the figures is advantageous over such a spring arrangement because it requires less components, is easier to assemble and maintain, and does not wear out as quickly.

Figure 7:
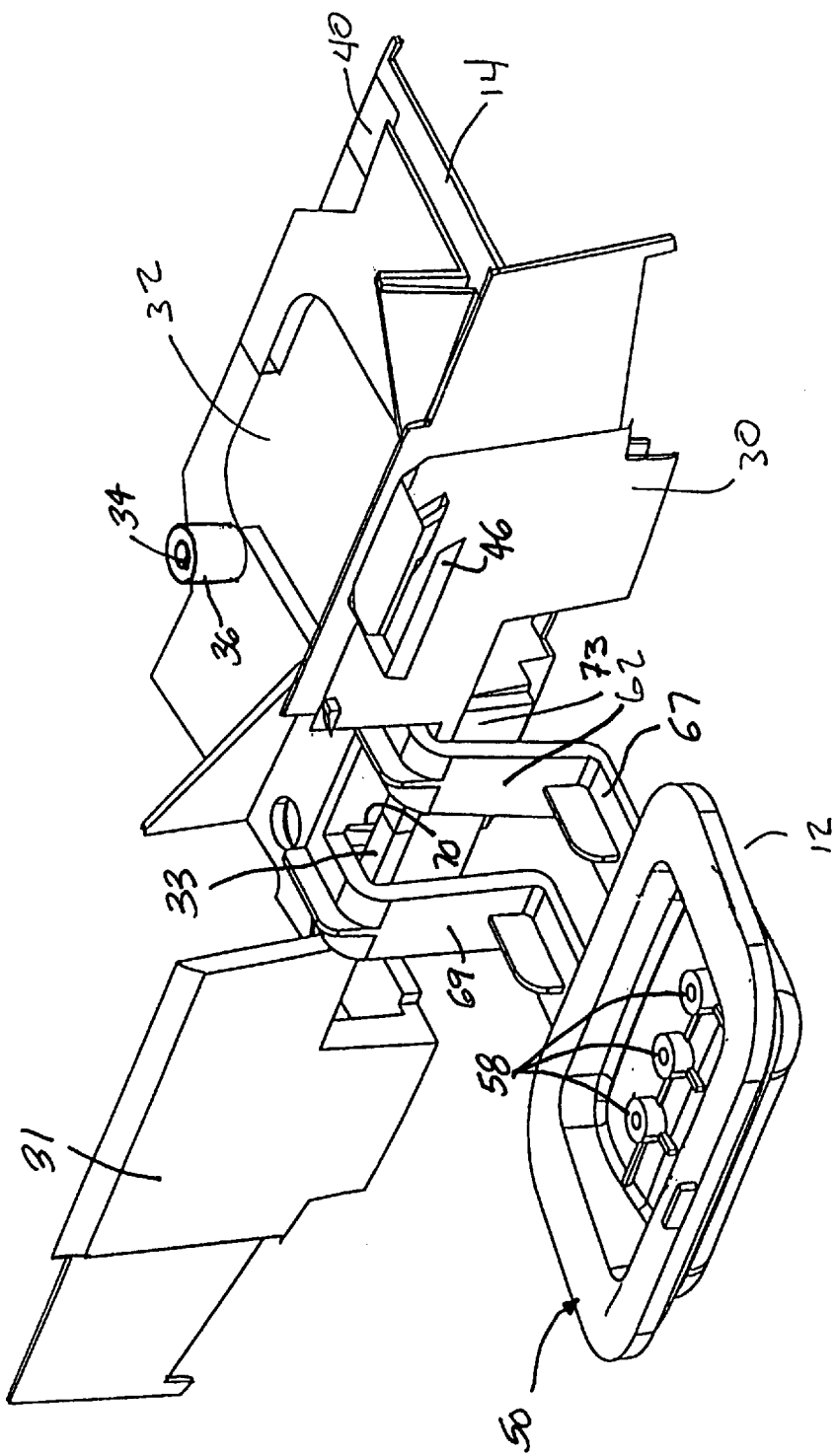
FIG. 7 is an assembled bottom perspective view of the partial console assembly in FIG. 5.
Figure 8:
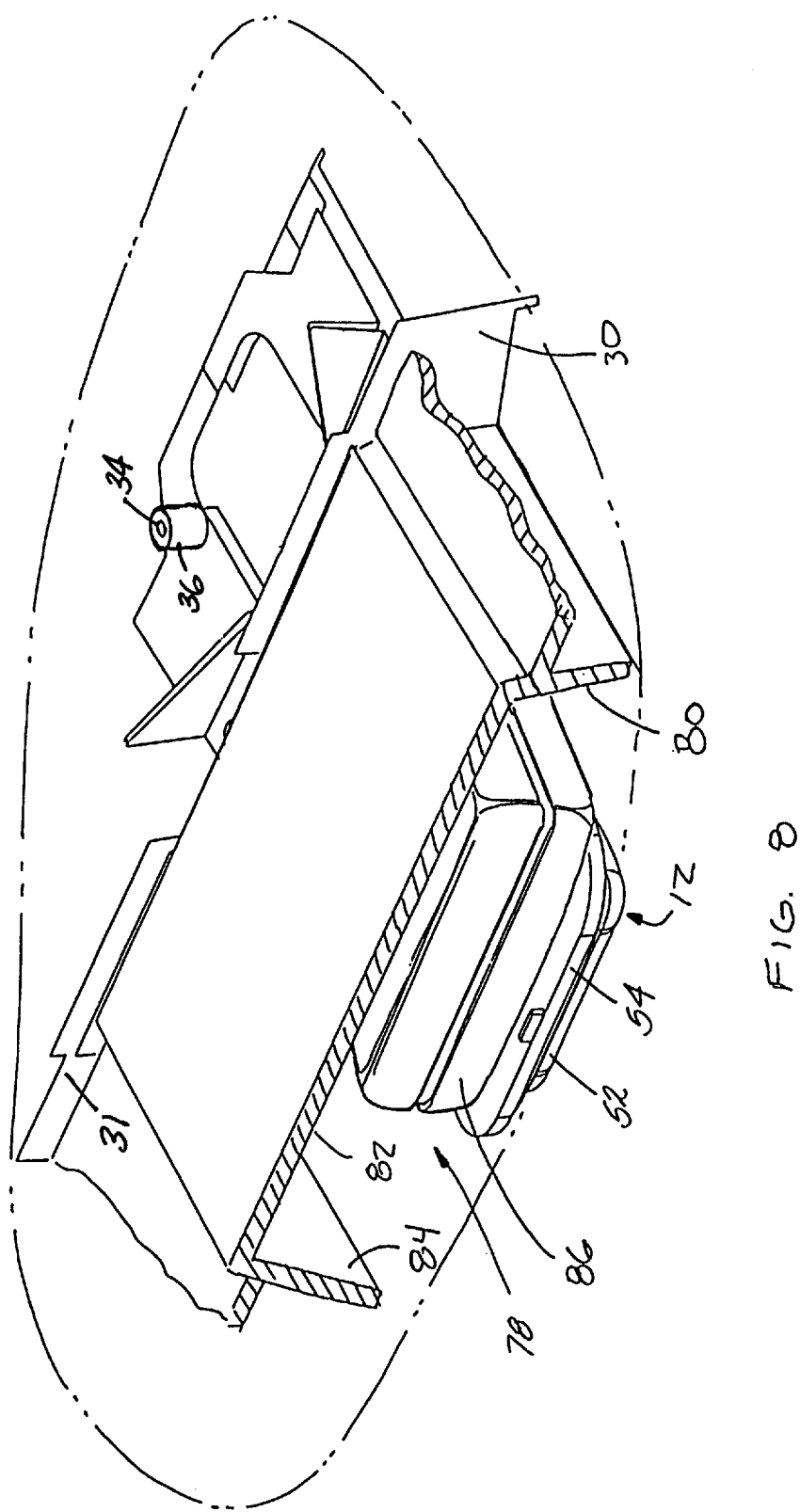
FIG. 8 is a bottom perspective view of the partial console assembly in FIG. 7 showing the compartment for accommodating a transmitter.

FIG. 8 is a bottom perspective view of the partial console assembly in FIG. 7 showing a compartment 78 for accommodating a transmitter 86. In FIG. 8, the compartment 78 is formed by walls 30, 80, 82, 84, and the interior side of door 10 (not shown in FIG. 8). The compartment is preferably large enough to accommodate a large transmitter. Upon opening door 10, the vehicle owner can slide the transmitter 86 between the internal surface 56 of button 12 and the inner surface of compartment wall 82.

Figure 9:
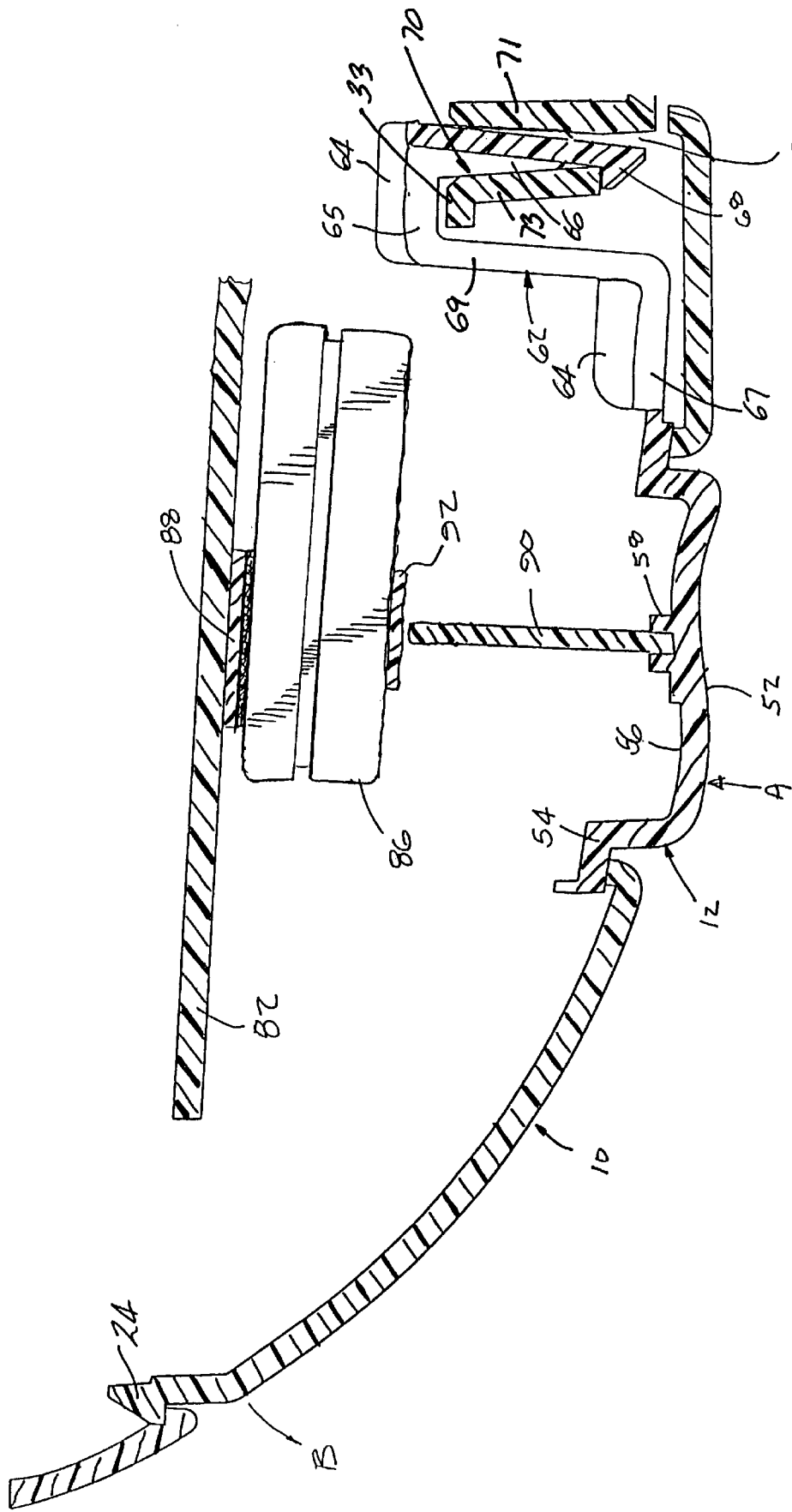
FIG. 9 is a cross-sectional view of the console assembly in FIG. 2 taken along section line 9—9 in FIG. 2 and showing the compartment wall from FIG. 8.
Figure 10:
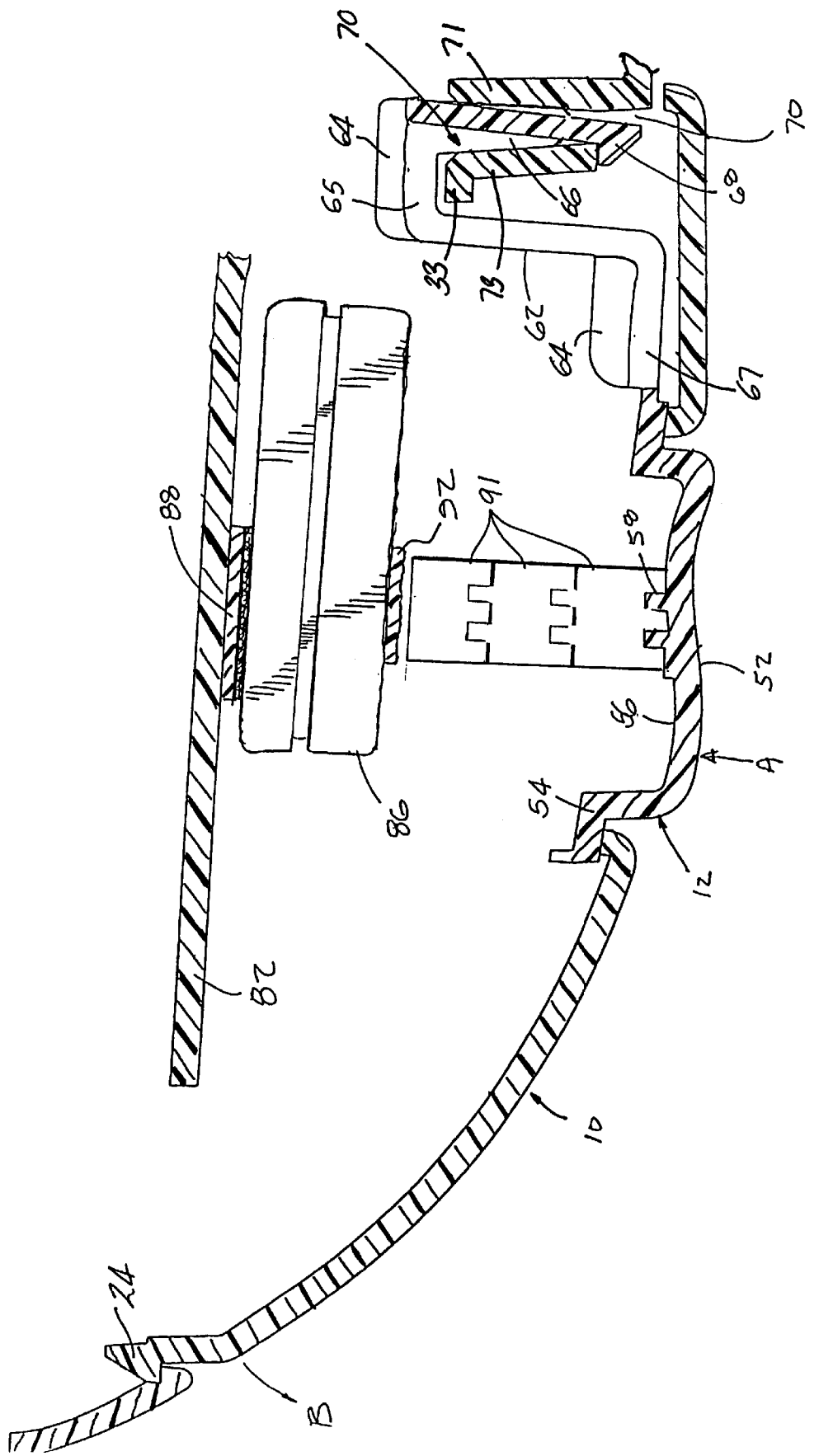
FIG. 10 is a cross-sectional view similar to FIG. 9 showing an alternate embodiment of a button actuator.

Referring now to FIG. 9, which illustrates the cross section along lines 9–9 of FIG. 2 along with the compartment shown in FIG. 8, the transmitter 86 can be secured to the wall 82 by any suitable means such as adhesive or Velcro 88. Alternatively, the transmitter 88 can be secured to the wall 82 using an elastic band which is either fastened to, or looped around, the wall 88. A peg 90 extends from one or more of the peg locator receptacles 58 toward the transmitter actuator switch 92. Alternatively, a striker block can be positioned on the receptacles 58 with respect to the actuator switch 92. By pressing button 12 in the direction of arrow A, the peg 90 is urged toward actuator 92 and the transmitter 86 is activated. The transmitter 86 and/or peg 90 can be removed from the console assembly 16 by pivoting open the door 10 in the direction of arrow B.

During normal use, a driver will pivot open the door 10 and find a Velcro fastener 88 attached to the inside of wall 82. The driver pulls one side of the Velcro from the fastener and peals away its adhesive backing which is then attached to the back side of the transmitter 86. The transmitter 86 is then secured button side down onto the mating Velcro attached to the compartment wall 82. The driver then inserts a peg 90 of appropriate length into one or more of the peg locator receptacles 58. The peg 90 may also be in the form of a striker block 91 (FIG. 10), such as a Lego-type block, and may be initially attached to the button 12 so that it is easily separated prior to assembly. The length and placement of the peg 90 or striker block(s) 91 depends on the size and position of the transmitter 86 relative to the button 12. Once the transmitter 86 and peg 90 or striker block(s) 91 are in place, the door 10 is latched closed so that the transmitter may be activated by pressing the button 12. The presence of the button 12 at one side of the compartment while the door 10 is open facilitates the selection and positioning of the peg 90 with respect to the button and the positioning of the transmitter 86 with respect to the button and peg. The transmitter 86 can be activated while the door is open, since the button is not attached with the door and therefore does not move with the door, in order to ascertain the proper location of the transmitter 86 in the compartment, as well as the proper length and position of the peg 90 or block(s) 91 in one or more of the receptacles 58.

Figure 11:
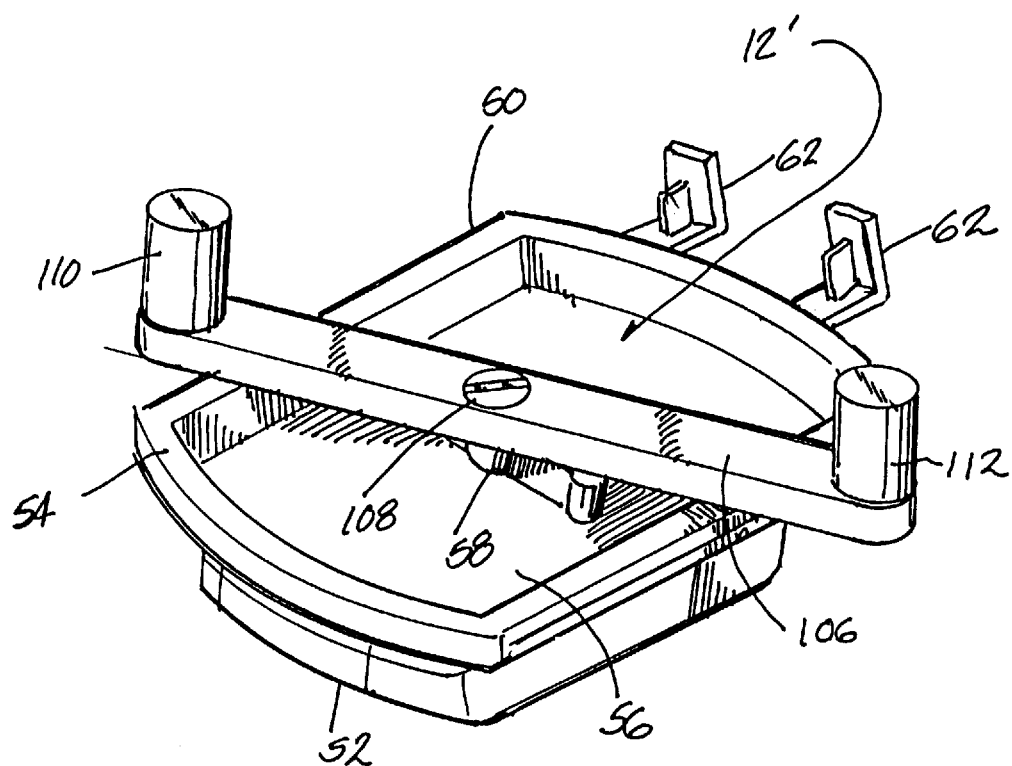
FIG. 11 is a bottom perspective view of the button in FIG. 3 showing a further embodiment of a button actuator.

Reference is now made to FIG. 11 which shown an alternative embodiment of the invention. An actuating button 12' is in all respects the same as button 12 in that it is mounted to the support structure 14 in the same manner as button 12. However, button 12' has a swing arm 106 rotatably attached to the upper side of the button 12' through a screw fastener 108 which extends through the swing arm 106 and is threaded into a central peg locator 58 extending from the surface 56 or other portion of the button 12'. The swing arm 106 includes bumpers 110, 112 of different length for depressing the transmitter actuator button 92. The swing arm 106 can be rotated about the screw fastener 108 to position one of the bumpers 110, 112 directly beneath the actuator switch 92 of the garage door opener 86. The bumper 110, 112 which most nearly contacts the actuator switch 92 when the button 12' is in its normal undepressed position will be selected for positioning beneath the garage door opener.

Figure 12:
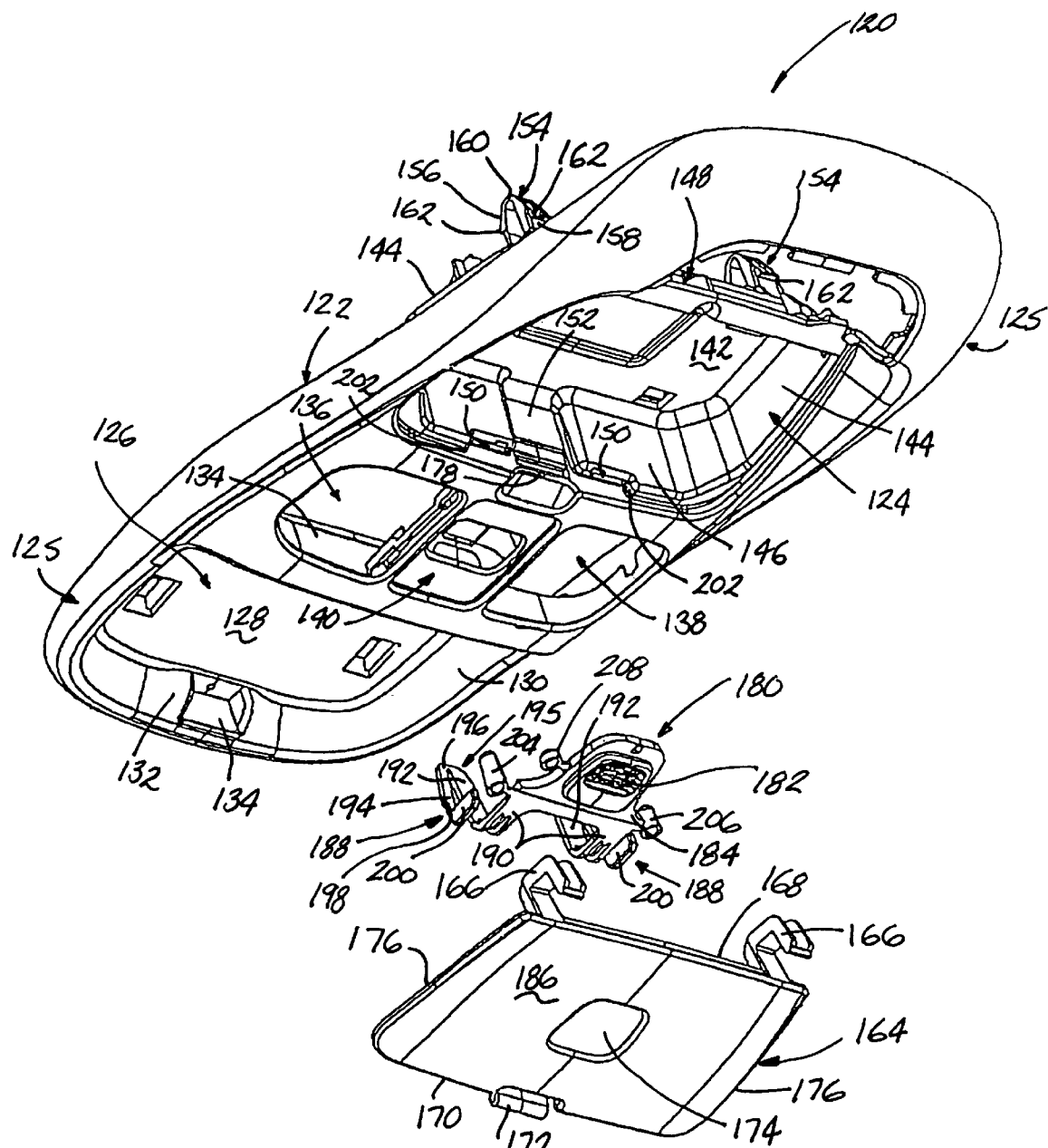
FIG. 12 is an exploded perspective view of an overhead console assembly according to a further embodiment of the invention.

With reference now to FIG. 12, an overhead console 120 according to a further embodiment of the invention includes a molded housing 122 having a bezel 125 that extends around an outer periphery of the overhead console. A front compartment 124 for holding a garage door actuator and a rear compartment 126 for mounting or storing other accessories are located within the confines of the bezel. The compartments open downwardly when the console 120 is installed in the roof of a vehicle. The rear compartment 126 includes an upper wall 128 integrally molded to side walls 130 (only one of which is shown), a rear wall 132, and a front wall (not shown). The rear wall 132 includes a depression 134 that cooperates with the latch of a door (not shown) for enclosing an interior space of the compartment 126.

A pair of side openings 136, 138 are located between the rear and front compartments. The openings 136, 138 receive lamp assemblies (not shown) for illuminating objects within the passenger compartment. A center opening 140 is located between the side openings 136, 138 for receiving a lamp switch, display, or other vehicle accessory (not shown).

The front compartment 124 includes an upper wall 142 integrally molded to side walls 144, a rear wall 146, and a front wall 148. The rear wall 146 includes a pair of slots 150 that extend on either side of a depression 152. that cooperates with the latch of a door (not shown) for enclosing an interior space of the compartment 126.

A plurality of snap connectors 154 are integrally molded to the upper walls 128 and 142 of the rear and front compartments, respectively. Each snap connector has a first leg 156 connected to a second leg 158 through a resilient central bight portion 160. A lower end of one or both of the legs can be integrally molded to one of the upper walls. Each leg includes a locking protrusion 162 that fits within an aperture (not shown) in the ceiling of a vehicle for locking the overhead compartment 120 to the vehicle. During installation, the snap connectors are aligned with the openings and are pushed upward into the openings. The legs 156, 158 flex toward each other until the locking protrusions slide past the openings. The legs then spring outwardly with the locking protrusions positioned above the openings to thereby lock the console to the vehicle ceiling with the bezel 155 adjacent the ceiling.

A front compartment door 164 is pivotally connected to the front wall 148 of the front compartment 124 for movement between a closed position for enclosing the interior space of the compartment and any accessories located therein, and an open position for permitting access to the interior of the compartment 124. A front edge 168 of the door includes a pair of spaced hinge arms 166 that pivotally attach to the front wall 148 in a well-known manner. A catch 178 is integrally formed with the rear wall 146 of the front compartment 124. The catch is in alignment with the depression 152 and cooperates with a latch member 172 on the door 164 to secure the door in the closed position. The latch member 172 is integrally formed with the door 164 and extends rearwardly of a rear edge 170 of the door 164. An opening 174 in the door 164 is located centrally between the rear and front edges 170, 168 and door side edges 176. is sized to receive a pad portion 176 of a removable actuator button 180.

An actuator button 180 includes a plate 181 with a pad portion 182 that protrudes downwardly from a lower surface 184 of the plate 181. The pad portion 182 is sized to fit within the opening 74 and can be flush with, or protrude below a lower surface 186 of the door 164. A pair of cantilever arms 188 are integrally molded with a forward portion of the actuator button 180. Each cantilever arm 188 includes a generally horizontally extending arm portion 190 that extends forwardly from the plate 181 and a generally vertically extending arm portion 192 that extends upwardly from the arm portion 190. Each arm portion 192 is joined with a branch 194 at an upper apex 196. The branch 194 extends downwardly from the upper apex 196 at an acute angle with respect to the arm portion 192 and can flex toward and away from the arm portion 192. The arm portion 192 together with the branch 194 define a bifurcated tab 195. A lower end of each branch 194 includes a ledge 198 and a generally horizontally extending finger 200.

The actuator button 180 is installed by aligning the bifurcated tab 195 of each cantilever arm 188 with one of the slots 150 in the rear wall 146 of the front compartment 124. The tabs 195 are then pressed into their corresponding slots 150, which causes the branches 194 to flex toward the arm portions 192 until the ledges 198 are clear of the side edges 202 adjacent the slots 150. The branches 194 then spring outwardly until the ledges 194 contact the side edges 202 to thereby lock the actuator button 180 to the overhead console independent of the console door 164. As with the previous actuator button embodiment, the cantilevered arms of the present embodiment are preferably formed of a material that exhibits some resiliency in order to create a natural bias of the pad portion 182 toward the opening 174 when installed on the overhead console without springs or other biasing mechanisms.

When it is desired to remove the actuator button 180 from the overhead console 120, the fingers 200 are pressed toward each other until the ledges 194 are clear of the side edges 202. The tabs 195 can then be pulled out of the slots 150 to free the actuator button 180 from the console 120. The average door opener can be easily positioned in the front compartment 129 when the actuator button 180 is removed.

A number of different sized pegs 204, 206 and 208 are connected to the actuator button 180 through integrally formed film hinges. The pegs can be easily broken away and mounted in locator receptacles (not shown) in an upper surface of the actuator button in the same manner as described in relation to the previous actuator button embodiment for contacting and pressing the transmitter actuator switch 92 when the button 180 is pressed.

It will apparent to those of ordinary skill in the art that reasonable variation and modifications to the preferred embodiments described above can be made without departing from the scope or spirit of the invention which is defined by the appended claims.

The embodiments for which an exclusive property or privilege is claimed are defined as follows:

1. In an overhead console for a vehicle having a support structure including walls and an access door defining a compartment for storing a remote transmitter, the transmitter having an actuator switch for operating the transmitter, the access door being attached to the support structure for movement between closed and open positions, a manually operable actuator engageable with the transmitter switch for operating the transmitter upon depression of the actuator, the improvement comprising:

the actuator being attached to and supported by the support structure independent of the door such that the actuator is supported independently of the door and can be moved independently of the door;

whereby the transmitter switch and actuator can be mutually aligned with the door in the open position by positioning the transmitter in the compartment and adjusting the transmitter with respect to the actuator in at least one direction.

2. An overhead console according to claim 1 wherein the actuator comprises a push button and at least one resilient cantilevered arm having a first end extending from the button and a second end attached to the support structure.

3. An overhead console according to claim 2 wherein the door has an aperture for receiving at least a portion of the button for accessing the button outside of the compartment, the at least one cantilever arm biasing the button toward the aperture.

4. An overhead console according to claim 3 and further comprising a flange on an outer periphery of the button that abuts an inner surface of the door when the door is in the closed position.

5. An overhead console according to claim 4 wherein the button has an outer surface for contact by a user and an inner surface with at least one receptacle facing the interior of the compartment; and an intermediate member for insertion in the at least one receptacle and for contacting the transmitter switch;

wherein depression of the button causes corresponding movement of the actuator switch and operation of the transmitter.

6. An overhead console according to claim 5 and further comprising additional intermediate members for selective insertion in the at least one receptacle.

7. An overhead console according to claim 6 wherein the intermediate members are of different lengths corresponding to different distances between the button inner surface and remote actuators of different heights, respectively.

8. An overhead console according to claim 7 wherein each intermediate member includes an upper surface with a receptacle and a lower surface, the lower surface of one intermediate member being engageable with the receptacle in an adjacent intermediate member whereby the intermediate members are stackable on each other to accommodate various distances between the button inner surface and remote actuators of different heights.

9. An overhead console according to claim 7 and further comprising a swing arm pivotally attached to the inner surface of the actuator, and wherein at least two of the intermediate members are connected to the swing arm for rotation therewith to thereby selectively position one of the intermediate members adjacent to the actuator switch.

10. An overhead console according to claim 6 wherein each intermediate member includes an upper surface with a receptacle and a lower surface, the lower surface of one intermediate member being engageable with the receptacle in an adjacent intermediate member whereby the intermediate members are stackable on each other to accommodate various distances between the button inner surface and remote actuators of different heights.

11. An overhead console according to claim 2 wherein the support structure comprises a slot and the second end of the cantilevered arm has a first tab that fits within the slot for attaching the actuator to the support structure.

12. An overhead console according to claim 11 and further comprising a locking tab connected to the cantilevered arm and extending into the slot for locking the actuator to the support structure.

13. An overhead console according to claim 12 and further comprising a second cantilevered arm with a first end extending from the button and a second end having a second tab that fits within the slot, the locking tab being positioned between the first and second tabs.

14. An overhead console according to claim 13 wherein the cantilevered arms are S-shaped.

15. An overhead console according to claim 11 wherein the tab is bifurcated into a generally vertically extending arm and a branch with a first end integrally attached to the arm and a second free end, the branch extending at an acute angle with respect to the arm, the branch being flexible toward and away from the arm during installation of the locking tab into the slot.

16. An overhead console according to claim 15 wherein the branch includes a ledge for engagement with the a side wall of the slot to thereby lock the actuator to the support structure.

17. An overhead console according to claim 16 and further comprising a finger extending from the branch free end, the finger being accessible outside of the slot for pressing the branch toward the arm to thereby release the tab from the slot.

18. An overhead console according to claim 1 wherein the actuator has an outer surface for contact by a user and an inner surface with at least one receptacle facing the interior of the compartment; and an intermediate member for insertion in the at least one receptacle and for contacting the transmitter switch;

wherein depression of the actuator causes corresponding movement of the actuator switch and operation of the transmitter.

19. An overhead console according to claim 18 and further comprising a plurality of intermediate members for insertion in the at least one receptacle.

20. An overhead console according to claim 19 wherein the intermediate members are of different lengths corresponding to different distances between the inner surface of the actuator and remote actuators of different heights, respectively.

21. An overhead console according to claim 20 wherein each intermediate member includes an upper surface with a receptacle and a lower surface, the lower surface of one intermediate member being engageable with the receptacle in an adjacent intermediate member whereby the intermediate members are stackable on each other to accommodate various distances between the inner surface of the actuator and remote actuators of different heights.

22. An overhead console according to claim 21 and further comprising a swing arm pivotally attached to the inner surface of the actuator, and wherein at least two of the intermediate members are connected to the swing arm for rotation therewith to thereby selectively position one of the intermediate members adjacent to the actuator switch.

23. An overhead console according to claim 1 wherein the actuator is removably mounted to the support structure for selective removal from the support structure and adjustable placement of the transmitter in the compartment.

\* \* \* \* \*